(12) United States Patent
Lee et al.

(10) Patent No.: US 9,718,354 B2
(45) Date of Patent: Aug. 1, 2017

(54) DISCONNECT SYSTEM FOR AN ALL-WHEEL DRIVE VEHICLE DRIVE TRAIN

(71) Applicant: Schaeffler Technologies AG & Co. KG, Herzogenaurach (DE)

(72) Inventors: Brian Lee, York, SC (US); Carsten Ohr, Charlotte, NC (US); Jeffrey Hemphill, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 186 days.

(21) Appl. No.: 14/684,611

(22) Filed: Apr. 13, 2015

(65) Prior Publication Data

US 2015/0300421 A1 Oct. 22, 2015

Related U.S. Application Data

(60) Provisional application No. 61/980,974, filed on Apr. 17, 2014.

(51) Int. Cl.

| *F16D 15/00* | (2006.01) |
|---|---|
| *F16H 48/24* | (2006.01) |
| *B60K 23/08* | (2006.01) |
| *B60K 17/35* | (2006.01) |
| *F16H 48/11* | (2012.01) |
| *F16H 48/10* | (2012.01) |
| *F16D 27/11* | (2006.01) |

(52) U.S. Cl.
CPC .............. *B60K 23/08* (2013.01); *B60K 17/35* (2013.01); *B60K 2023/0833* (2013.01); *F16D 27/11* (2013.01); *F16H 48/11* (2013.01); *F16H 2048/106* (2013.01)

(58) Field of Classification Search
CPC .......... F16D 15/00; F16H 48/24; F16H 48/34
See application file for complete search history.

(56) References Cited

U.S. PATENT DOCUMENTS

| 5,103,690 | A | * | 4/1992 | Macpherson | ...... B60K 17/3505 180/233 |
|---|---|---|---|---|---|
| 5,911,643 | A | * | 6/1999 | Godlew | .................. F16H 48/08 475/150 |
| 6,182,808 | B1 | * | 2/2001 | Walton | ................. B60K 17/351 192/35 |
| 6,537,172 | B1 | * | 3/2003 | McAuliffe, Jr. | ........ F16H 48/22 475/150 |
| 7,975,796 | B2 | | 7/2011 | Guo | |
| 8,382,633 | B2 | | 2/2013 | Cooper et al. | |

(Continued)

FOREIGN PATENT DOCUMENTS

EP 2181011 B1 2/2012

*Primary Examiner* — Tisha Lewis
(74) *Attorney, Agent, or Firm* — Davidson, Davidson & Kappel, LLC

(57) ABSTRACT

A disconnect system for an all-wheel drive vehicle drive train is provided. The disconnect system includes a first torque transmitter, a second torque transmitter and a clutch selectively connecting the first torque transmitter and the second torque transmitter. The clutch includes an engagement section and an inner race and an outer race supporting the engagement section. The inner race is arranged to be forced against the engagement section to lock the clutch and moved away from the engagement section to unlock the clutch.

20 Claims, 4 Drawing Sheets

(56) References Cited

U.S. PATENT DOCUMENTS

| | | |
|---|---|---|
| 8,523,737 B1 | 9/2013 | Krysztof et al. |
| 2004/0110594 A1* | 6/2004 | Goto ..................... F16D 41/088 |
| | | 475/150 |
| 2008/0053780 A1 | 3/2008 | Hamrin et al. |
| 2011/0061983 A1* | 3/2011 | Sato ....................... F16D 27/10 |
| | | 192/38 |
| 2012/0202636 A1 | 8/2012 | Perakes et al. |
| 2013/0178318 A1* | 7/2013 | Perakes ............... B60K 17/346 |
| | | 475/86 |
| 2014/0069761 A1* | 3/2014 | Schoolcraft ........... F16D 41/088 |
| | | 192/45.005 |

* cited by examiner

DISCONNECT SYSTEM FOR AN ALL-WHEEL DRIVE VEHICLE DRIVE TRAIN

This claims the benefit to U.S. Provisional Patent Application No. 61/980,974, filed on Apr. 17, 2014, which is hereby incorporated by reference herein.

The present disclosure relates generally to motor vehicle drive trains and more specifically to disconnect systems for all-wheel drive vehicle drive trains.

BACKGROUND

Disconnecting a secondary axle in an all-wheel drive (AWD) vehicle may improve fuel economy. Known disconnect systems are typically placed in a power takeoff unit (PTU) and require additional volume to be fit into the vehicle. Placing the disconnect system within the space of a typical bevel gear differential allows for easier incorporation into the vehicle.

U.S. Pat. No. 7,975,796; U.S. Pub. 2008/053780; EP 2 181 011; U.S. Pat. Nos. 8,523,737; 8,382,633; and U.S. Patent 2012/0202636 disclose systems for disconnecting a secondary axle in an AWD vehicle.

SUMMARY OF THE INVENTION

The systems in the above patent documents may all require too much packaging volume and/or too much actuation energy. The present disclosure provides a disconnect system with a compact clutch with adequate actuation energy.

A disconnect system for an all-wheel drive vehicle drive train is provided. The disconnect system includes a first torque transmitter, a second torque transmitter and a clutch selectively connecting the first torque transmitter and the second torque transmitter. The clutch includes an engagement section and an inner race and an outer race supporting the engagement section. The inner race is arranged to be forced against the engagement section to lock the clutch and moved away from the engagement section to unlock the clutch.

A disconnect system for an all-wheel drive vehicle drive train according to a second aspect of the invention is provided. The disconnect system includes a first torque transmitter, a second torque transmitter, a wedge clutch selectively connecting the first torque transmitter and the second torque transmitter and an electromagnet controllable to effect the selective connection of the first torque transmitter and the second torque transmitter via the wedge clutch.

A method for forming a disconnect system for an all-wheel drive vehicle drive train is also provided. The method includes providing an inner race of a clutch on an intermediate shaft, providing an outer race of the clutch on a differential, and providing an actuator on the intermediate shaft. The actuator is operable to axially move the inner race for selectively engaging the clutch.

BRIEF DESCRIPTION OF THE DRAWINGS

The present invention is described below by reference to the following drawings, in which.

DETAILED DESCRIPTION

The present disclosure provides a combination PTU disconnect and a planetary differential. The disconnect clutch is engaged by a spring urging a conical inner race against a wedge clutch plate. An electromagnet pulls the inner race away to disengage the PTU. The space occupied by the assembly is the same as a conventional bevel gear differential. In alternative embodiments, other types of clutches (i.e., a dog clutch or synchronizer cone clutch) and/or actuation methods (i.e., hydraulic, pneumatic, electromechanical) may be used.

Figure 1:
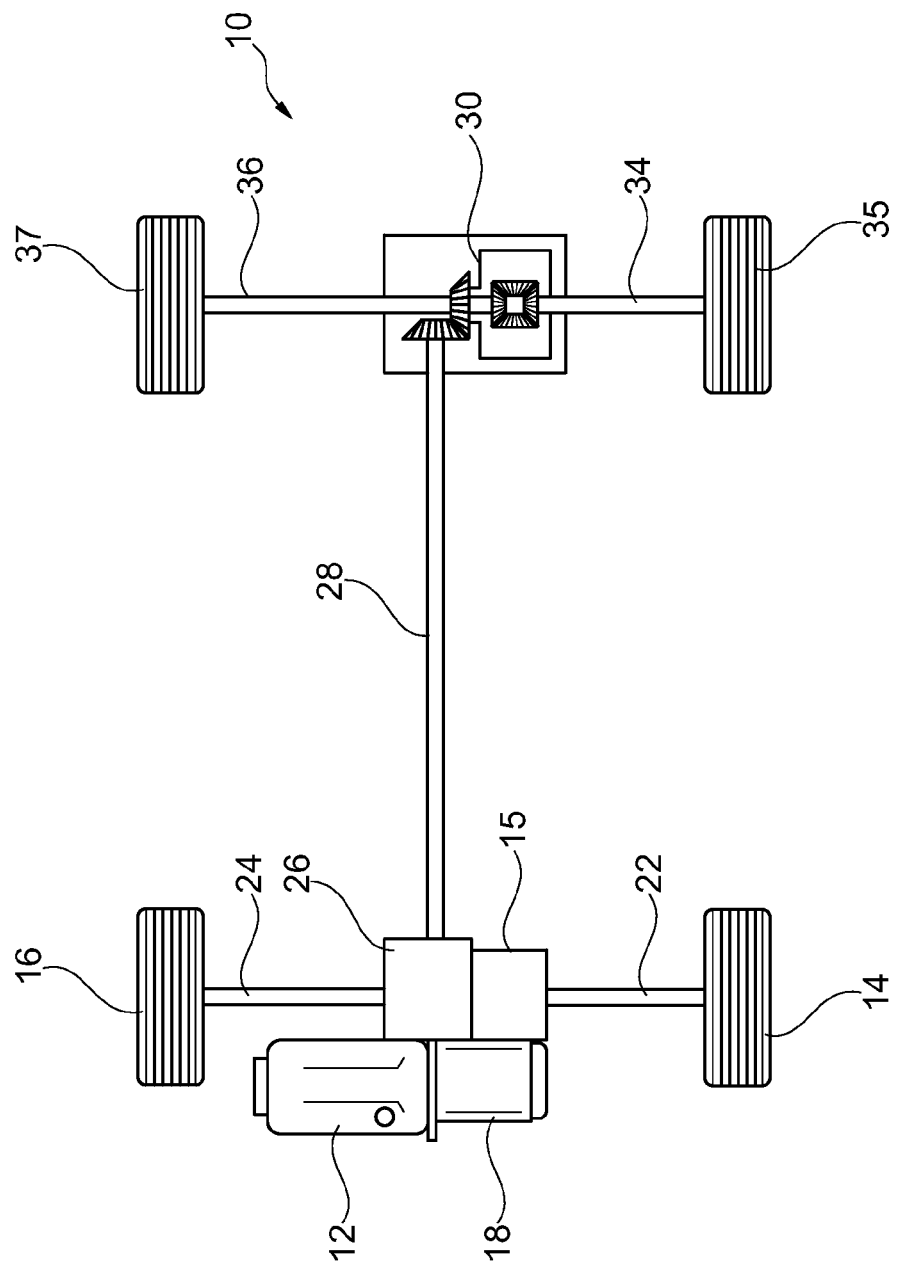
FIG. 1 shows an AWD motor vehicle drive train including a disconnect system according to an embodiment of the present invention.

FIG. 1 shows an AWD motor vehicle drive train 10 including a disconnect system 15 according to an embodiment of the present invention. Drive train 10 includes an engine 12 driving a pair of front wheels 14, 16 via a transmission 18. Disconnect system 15 includes a front differential 20 (FIG. 2) provided between transmission 18 and respective axles 22, 24 of front wheels 14, 16 to allow for speed differences between front wheels 14, 16. A power takeoff unit (PTU) 26 is connected to front differential 20 for transferring power via a rear wheel drive shaft 28 to a pair of rear wheels 35, 37 via respective axles 34, 36. Rear wheel drive shaft 28 is connected to a rear differential 30 from which rear axles 34, 36 extend. Disconnect system 15 includes a clutch 40 (FIG. 2) for connecting PTU 26 to front differential 20 so that rear wheels 35, 37 may be driven with front wheel 14, 16 in AWD situations.

Figure 2:
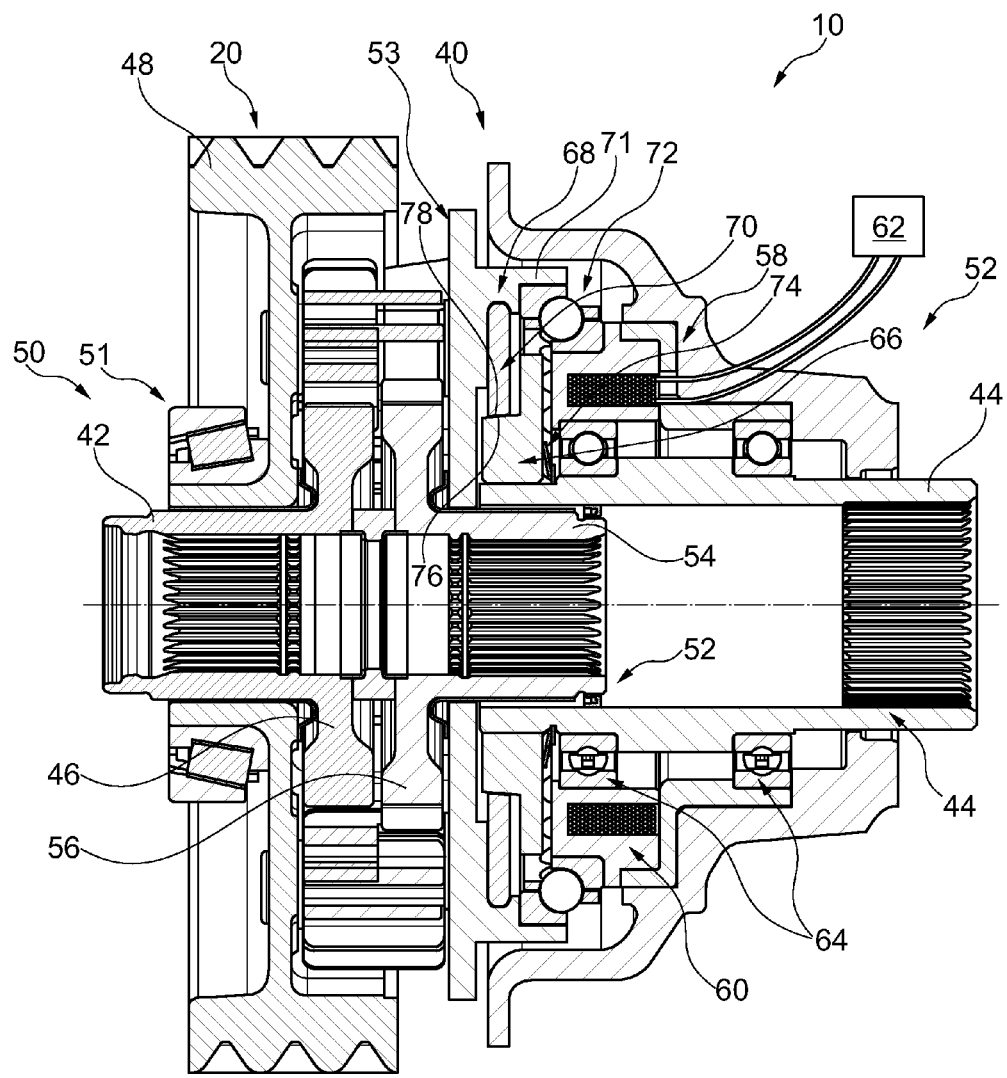
FIG. 2 shows a cross-sectional side view of a disconnect system in accordance with an embodiment of the present invention.

FIG. 2 shows disconnect system 15. Disconnect system 15 includes clutch 40 for selectively connecting a first torque transmitter 48 and a second torque transmitter 44. In this embodiment, first torque transmitter 48 is an input component, in the form of a drive ring gear configured to receive torque from engine 12, and second torque transmitter 44 is an intermediate shaft for connecting to PTU 26. Disconnect system 15 further includes a wheel-side output shaft 42 configured for connecting to front wheel axle 22. Output shaft 42, which is on a first axial side 50 of system 15, is part of front differential 20, which in this embodiment is a planetary differential, and is formed integrally with a sun gear 46. Drive ring gear 48 surrounds output shaft 42. A hub of ring gear 48 supports a differential support bearing 51 on an outer radial surface thereof. On a second axial side 52 opposite first side 50, planetary differential 20 includes a differential carrier 53 surrounding a second output shaft 54. Second output shaft 54, which is formed integrally with a sun gear 56, is configured for connecting to front wheel axle 24.

An actuator 58 for selectively connecting intermediate shaft 44 to planetary differential 20 via clutch 40 is pressed into that transmission case. Actuator 58 is formed by an electromagnet 60 provided with a controller 62 for regulating the supply of electric current to electromagnet 60. Bearings 64 positioned radially inside of actuator 58 and on an outer radial surface of intermediate shaft 64 support intermediate shaft 44 for rotation.

Clutch 40, in this embodiment, is formed as a wedge clutch including an inner race 66, an outer race 68 and an engagement section in the form of a wedge plate 70 for selectively wedging between inner and outer races 66, 68. Inner race 66 is attached to an outer surface of intermediate shaft 44 such that inner race 66 is nonrotatably fixed for rotation with intermediate shaft 44 by splines and axially slidably on intermediate shaft 44. Outer race 68 is formed by an axial protrusion 71 of differential carrier 53. Differential carrier 53, at protrusion 71, is supported for rotation independent of intermediate shaft 44 by a differential support bearing 72, which is mounted on an outer radial surface of electromagnet 60. An elastic element 74, which is formed as disc spring in this embodiment, is provided on the outer radial surface of intermediate shaft 44 for pressing inner race 66 axially away from electromagnet 60 and toward planetary differential 20.

Inner race 66 includes a tapered outer radial surface 76 for interacting with a tapered inner radial surface 78 of wedge plate 70. In this embodiment, both tapered surfaces 76, 78 are frustoconically shaped for mating with each other. When electromagnet 60 is not provided with current via controller 62, disc spring 74 forces inner race 66 against wedge plate 70 with sufficient force such that wedge plate 70, due to the interaction of tapered surfaces 76, 78, is forced radially outward by inner race 66 against outer race 68 and intermediate shaft 44 is circumferentially driven by differential carrier 53 via clutch 40. In this locked state of clutch 40, wedge plate 70 is radially compressed between inner race 66 and outer race 68. When electromagnet 60 is provided with current via controller 62, inner race 66 is pulled by electromagnet 60 axially toward electromagnet 60 and away from planetary different 20, such that electromagnet 60 compresses spring 74 to a sufficient degree to cause the radial decompression of wedge plate 70. This radial decompression of wedge plate 70 results in an unlocked state of clutch 40, in which differential carrier 53 rotates without circumferentially driving intermediate shaft 44.

Figure 3A:
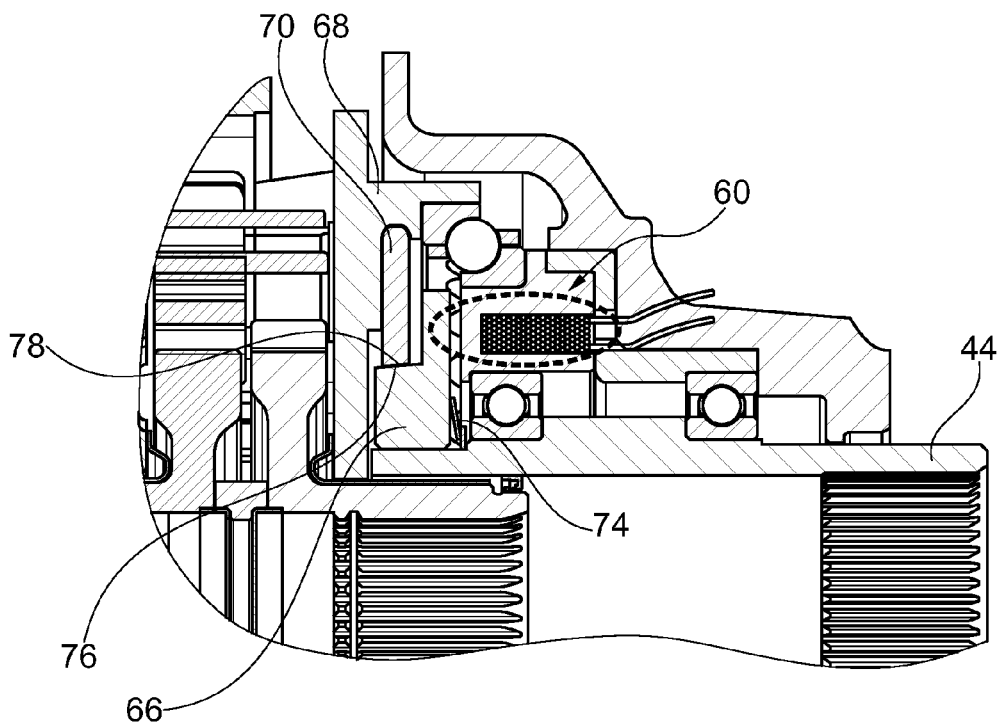
FIGS. 3a and 3b show cross-sectional side views of the disconnect system shown in FIG. 1, illustrating the locked and unlocked positions of a clutch of the disconnect system.
Figure 3B:
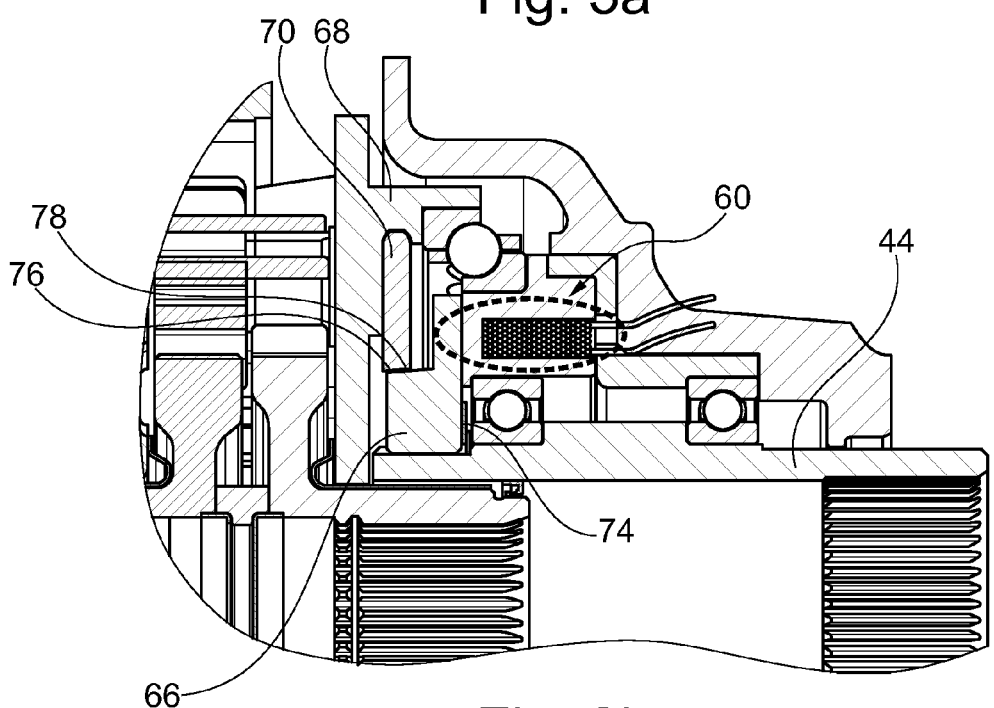

FIGS. 3a and 3b show cross-sectional side views of disconnect system 15, illustrating the locked and unlocked positions of clutch 40. In FIG. 3a, electromagnet 60 is powered off by controller 62, and disc spring 74 is pressing inner race 66 against wedge plate 70 with a force sufficient to cause inner race 66 to force wedge plate 70 against outer race 68 such that wedge plate 70 becomes wedged between inner race 66 and outer race 68 and transmits torque from differential 20 to intermediate shaft 44. As shown in FIG. 3a, inner race 66 is held away from electromagnet 60. In FIG. 3b, electromagnet 60 is powered on by controller 62, and the magnetic forces of electromagnet 60 overcome the forces of disc spring 74 to compress disc spring 74 and pull inner race 66 against an axial surface of electromagnet 60. As inner race 66 is pulled by electromagnet 60, the interaction between tapered surfaces 76, 78 is minimized and planetary differential 20 does not rotate intermediate shaft 44 via clutch 40. In an alternative embodiment, spring 74 may be omitted and electromagnet 60 may be designed to both push inner race 66 into engagement with wedge plate 70 and to pull inner race 66 out of engagement with wedge plate 70.

Figure 4:
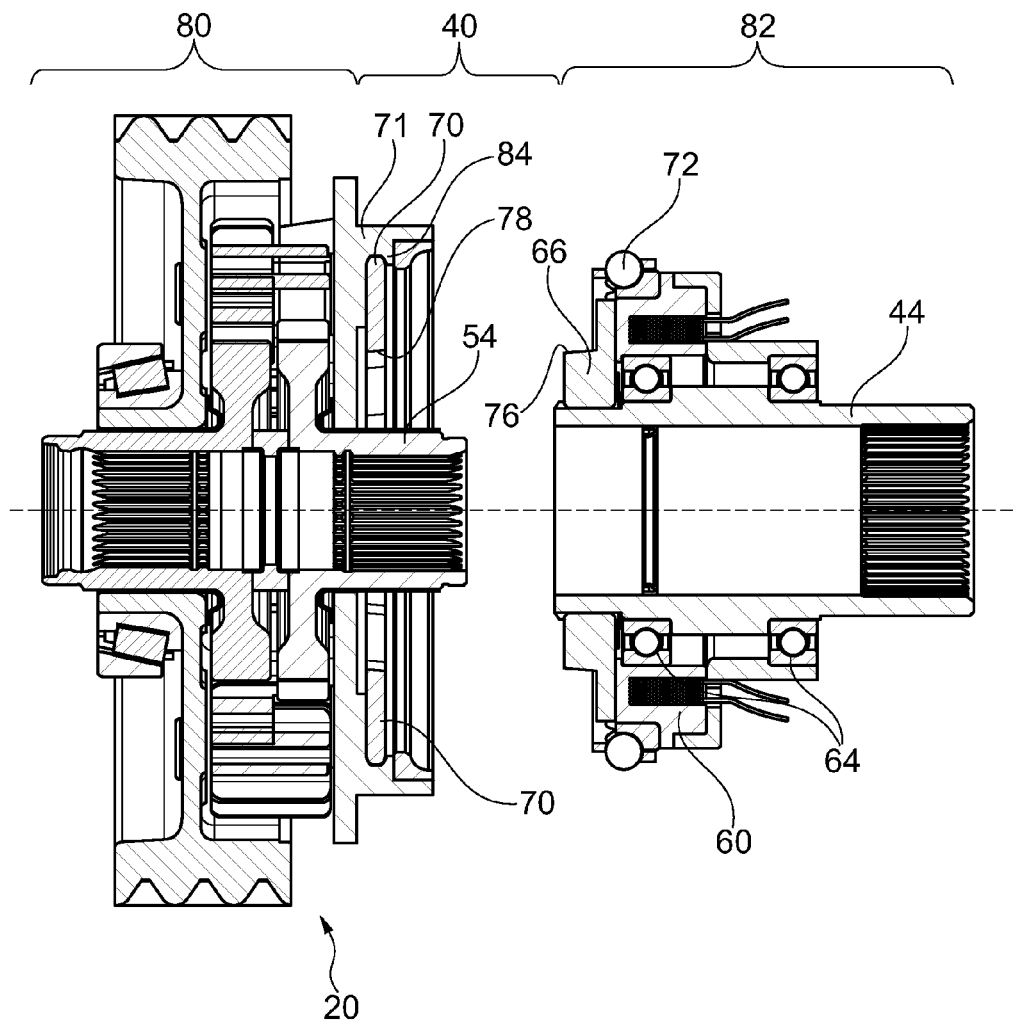
FIG. 4 shows an exploded cross-sectional side view of the disconnect system shown in FIG. 1.

FIG. 4 shows an exploded cross-sectional side view of disconnect system 15. FIG. 4 illustrates that disconnect system 15 may be formed by two subassemblies 80, 82. First subassembly 80 is formed by planetary differential 20 and wedge plate 70 and second subassembly 82 is formed by intermediate shaft 44 and components mounted thereon, including inner race 66, disc spring 74, bearings 64, 72, such that both subassemblies include components of clutch 40. Wedge plate 70 may be connected to planetary differential 20 by snapping wedge plate 70, which is annular, into a radially protruding lip 84 of axial protrusion 71. Accordingly, disconnect system 15 may be formed by constructing subassemblies 80, 82 separately, then axially mounting the second subassembly 82 on first subassembly 80 by axially sliding intermediate shaft 44 onto shaft 54 such that tapered surface 76 of inner race 66 is received radially inside of wedge plate 70.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A disconnect system for an all-wheel drive vehicle drive train comprising:
   a first torque transmitter;
   a second torque transmitter;
   a clutch selectively connecting the first torque transmitter and the second torque transmitter, the clutch including an engagement section and an inner race and an outer race supporting the engagement section, the inner race arranged to be forced against the engagement section to lock the clutch and moved away from the engagement section to unlock the clutch;
   an actuator for axially moving the inner race for selective connection of the first torque transmitter and the second torque transmitter via the clutch and
   an elastic element for forcing the inner race against the engagement section to lock the clutch, the actuator for axially moving the inner race away from the engagement section to unlock the clutch.

2. The disconnect system as recited in claim 1 wherein the actuator includes an electromagnet.

3. The disconnect system as recited in claim 2 wherein the electromagnet is powered on to axially move the inner race away from the engagement section to unlock the clutch.

4. The disconnect system as recited in claim 2 wherein the inner race is held against the electromagnet in an unlocked state of the clutch.

5. The disconnect system as recited in claim 2 further comprising an elastic element, the inner race being held spaced away from the electromagnet by elastic element in a locked state of the clutch.

6. The disconnect system as recited in claim 1 wherein the engagement section is a wedge plate.

7. A disconnect system for an all-wheel drive vehicle drive train comprising:
   a first torque transmitter;
   a second torque transmitter;
   a clutch selectively connecting the first torque transmitter and the second torque transmitter, the clutch including an engagement section and an inner race and an outer race supporting the engagement section, the inner race arranged to be forced against the engagement section to lock the clutch and moved away from the engagement section to unlock the clutch, wherein the inner race includes a tapered outer surface, the engagement section being radially compressed by the tapered outer surface when the inner race is forced against the engagement section to lock the clutch.

8. The disconnect system as recited in claim 1 wherein the first torque transmitter is an input component configured to receive torque from engine.

9. The disconnect system as recited in claim 1 wherein the second torque transmitter is a power takeoff unit-side shaft.

10. A disconnect system for an all-wheel drive vehicle drive train comprising:
- a first torque transmitter;
- a second torque transmitter;
- a wedge clutch selectively connecting the first torque transmitter and the second torque transmitter; and
- an electromagnet controllable to effect the selective connection of the first torque transmitter and the second torque transmitter via the wedge clutch, the wedge clutch including a wedge plate and an inner race and an outer race supporting the wedge plate; and
- an elastic element forcing the inner race against the wedge plate to lock the wedge clutch.

11. The disconnect system as recited in claim 10 wherein the first torque transmitter is an input component of a planetary differential, the outer race being part of the planetary differential.

12. The disconnect system as recited in claim 11 wherein the outer race is formed by a differential carrier of the planetary differential.

13. The disconnect system as recited in claim 10 wherein the second torque transmitter is configured for connection to a power takeoff unit.

14. The disconnection system as recited in claim 7 further comprising an actuator for axially moving the inner race for selective connection of the first torque transmitter and the second torque transmitter via the clutch.

15. The disconnection system as recited in claim 14 wherein the actuator includes an electromagnet.

16. The disconnection system as recited in claim 15 wherein the electromagnet is powered on to axially move the inner race away from the engagement section to unlock the clutch.

17. The disconnection system as recited in claim 16 wherein the inner race is held spaced away from the electromagnet by an elastic element in a locked state of the clutch.

18. The disconnection system as recited in claim 7 wherein the engagement section is a wedge plate.

19. The disconnection system as recited in claim 7 wherein the first torque transmitter is an input component configured to receive torque from engine.

20. The disconnection system as recited in claim 7 wherein the second torque transmitter is a power takeoff unit-side shaft.

* * * * *